United States Patent [19]

Shimizu et al.

[11] Patent Number: 4,666,256
[45] Date of Patent: May 19, 1987

[54] MICROSCOPE OBJECTIVE LENS

[75] Inventors: Yoshiyuki Shimizu; Takashi Mori, both of Miura, Japan

[73] Assignee: Nippon Kogaku K. K., Tokyo, Japan

[21] Appl. No.: 717,798

[22] Filed: Mar. 29, 1985

Related U.S. Application Data

[63] Continuation-in-part of Ser. No. 551,842, Nov. 15, 1983, Pat. No. 4,588,264.

[30] Foreign Application Priority Data

Nov. 30, 1982 [JP] Japan ................. 57-208652
Aug. 25, 1983 [JP] Japan ................. 58-155442
Mar. 30, 1984 [JP] Japan ................. 59-62934

[51] Int. Cl.$^4$ .................... G02B 9/62; G02B 21/02
[52] U.S. Cl. ...................................... 350/414
[58] Field of Search ......................... 350/414, 464

[56] References Cited

U.S. PATENT DOCUMENTS 4,261,654 4/1981 Rybicki ................. 350/414
4,403,835 9/1983 Ushida ................. 350/414

Primary Examiner—John K. Corbin
Assistant Examiner—Rebecca D. Gass
Attorney, Agent, or Firm—Shapiro and Shapiro

[57] ABSTRACT

A microscope objective lens which, in spite of having a great numerical aperture and a high magnification, can always maintain an excellent imaging performance even if the thickness of a parallel flat plate such as a cover glass disposed between the object surface and the objective lens is greatly varied. The microscope objective lens has, in succession from the object side, a first lens group of positive refractive power for converting the light flux from an object into a convergent light flux, the first lens group having a positive meniscus lens component with its concave surface facing the object side and having a cemented lens component, a second lens group having a cemented lens component of negative refractive power disposed in the convergent light flux, and a third lens group of negative refractive power having a meniscus lens component with its convex surface facing the object side and having a succeeding negative lens component. The second lens group is movable on the optical axis relative to the first and third lens groups to correct deterioration of imaging performance due to variation in thickness of the parallel flat plate.

24 Claims, 18 Drawing Figures

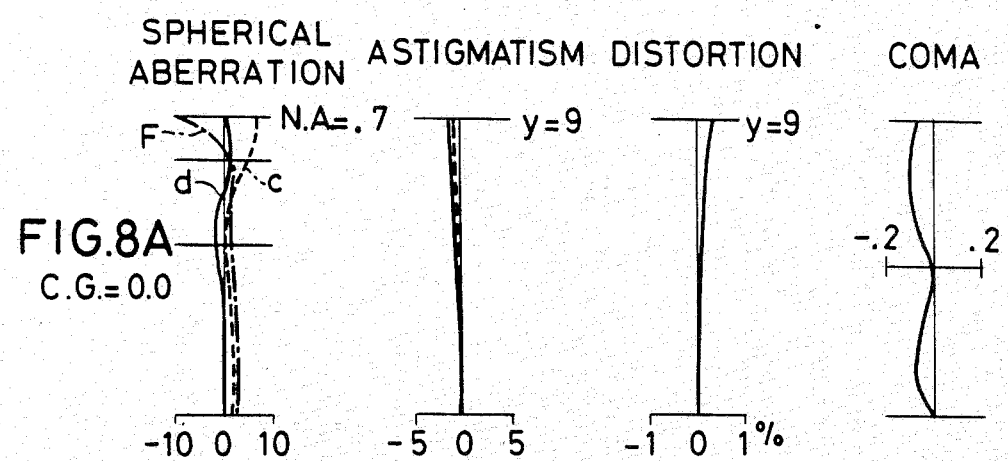
FIG.8A  C.G.=0.0
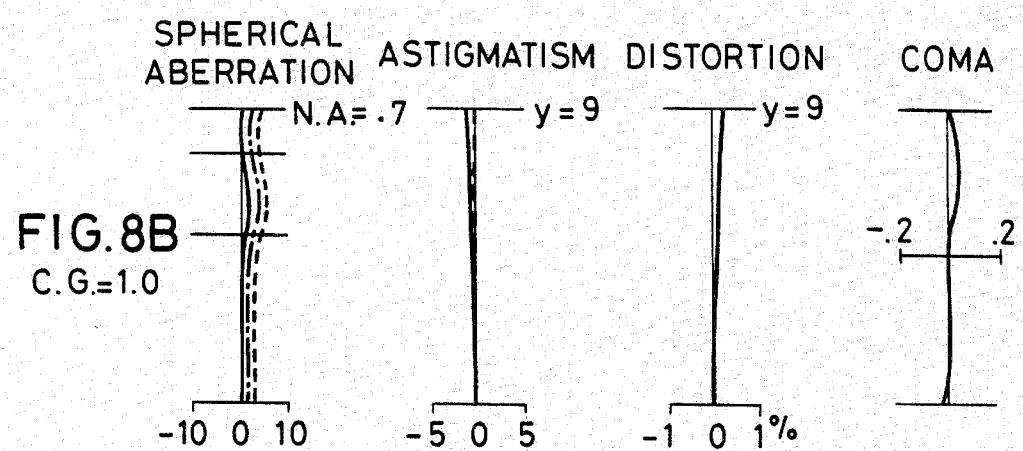
FIG.8B  C.G.=1.0
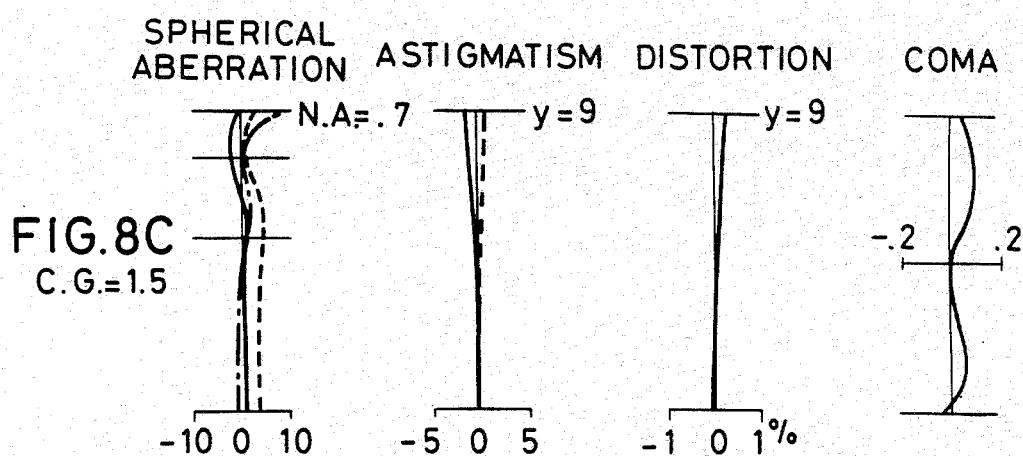
FIG.8C  C.G.=1.5

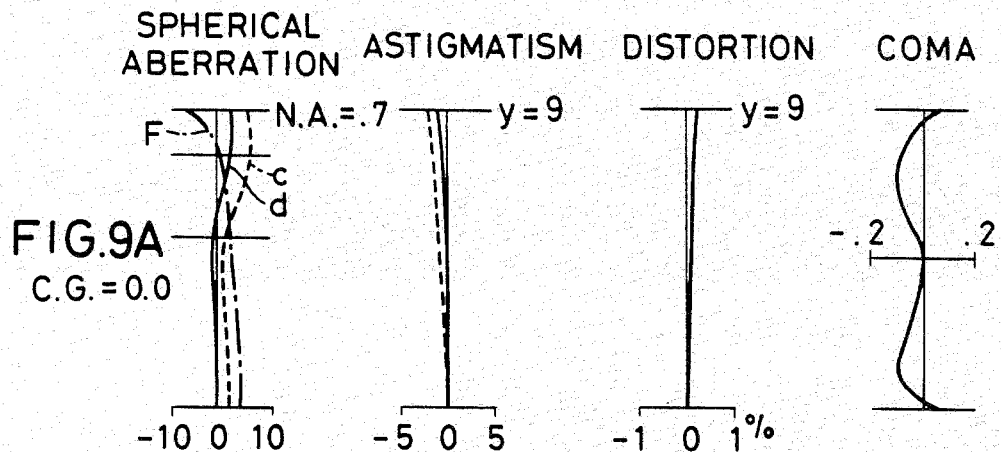
FIG.9A C.G.=0.0
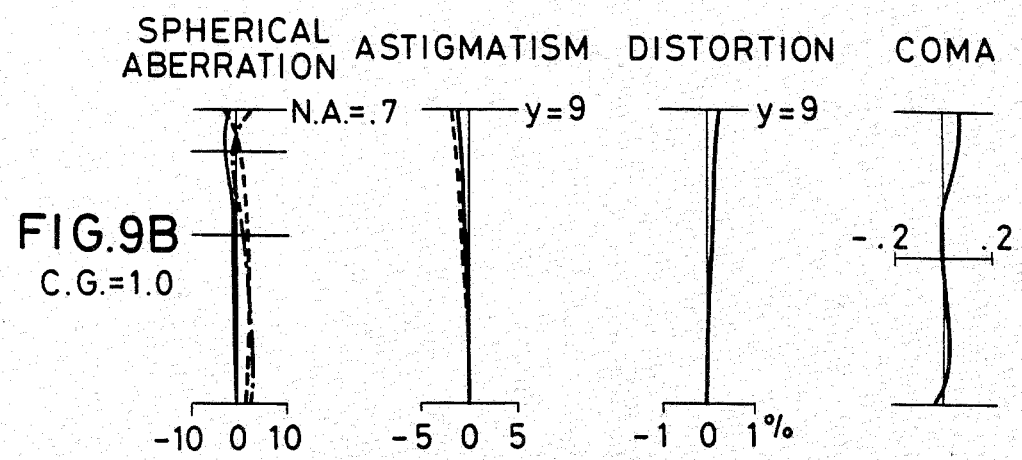
FIG.9B C.G.=1.0
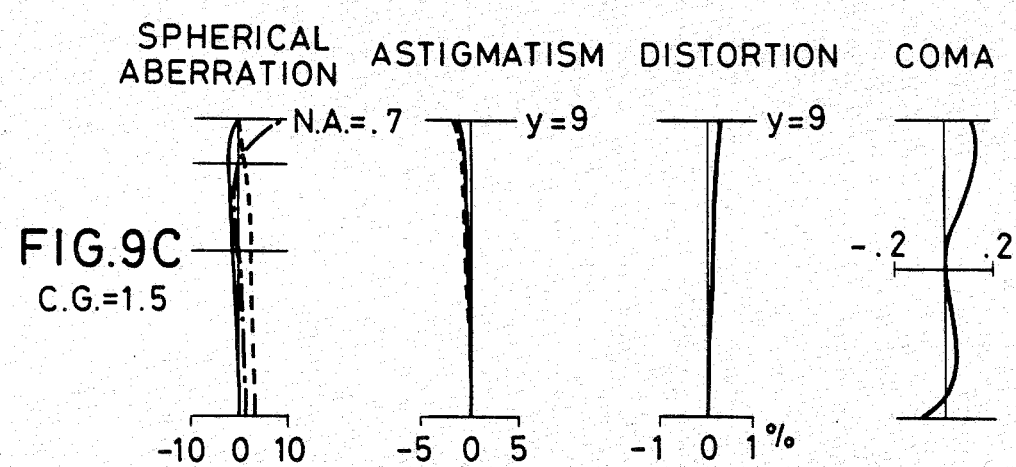
FIG.9C C.G.=1.5

C.G.=0.0

C.G.=1.0

C.G.=1.5

MICROSCOPE OBJECTIVE LENS

CROSS-REFERENCE TO RELATED APPLICATION

This application is a continuation-in-part of U.S. application Ser. No. 551,842, filed Nov. 15, 1983 now U.S. Pat. No. 4,588,264 (incorporated herein by reference).

BACKGROUND OF THE INVENTION

1. Field of the Invention

This invention relates to a dry system microscope objective lens of high magnification.

2. Description of the Prior Art

Generally, microscope objective lenses used under transmission illumination like those for biological purposes are designed on the premise that the thickness of the cover glass is a predetermined reference value and therefore, where the thickness of the cover glass differs from the reference value, the imaging of performance of the objective lens is deteriorated. Such tendency becomes more remarkable as the N.A. (numerical aperture) of the objective lens is greater. For this reason, as an objective lens with a correction ring, there is known an objective lens in which the lens spacing in the objective lens is varied with a variation in the thickness of the cover glass to thereby prevent aggravation of aberrations and maintain a substantially good imaging performance. However, in the conventional popular objective lens with a correction ring, the range of aberration correction for the variation in the thickness of the cover glass is very narrow, and in the case of N.A. of the order of 0.6, the thickness range of 0.2-0.3 mm has been the practical limit.

In contrast, Japanese Laid-open Patent Application No. 142508/1981 (corresponding U.S. Pat. No. 4,403,835) discloses a technique in which a microscope objective lens comprises, in succession from the object side, a first lens group which is a positive cemented meniscus lens having its concave surface facing the object side, a second lens group which is a positive lens or a cemented positive lens and a third lens group of positive synthesized refractive power and wherein only the second lens group is moved along the optical axis in accordance with a variation in the thickness of a parallel flat plate disposed between the object surface and the objective lens, whereby a good imaging performance is maintained even if there is a wide range of variation in the thickness of the parallel flat plate. According to this technique, it is certainly possible to maintain an excellent imaging performance over a very wide range of variation in the thickness of the parallel flat plate, say, ±1.0 mm. In this technique, however, an objective lens having N.A. of the order of 0.6 and a magnification of the order of 40 times is the practical limit, and this has been insufficient as an objective lens having a greater N.A. or a higher magnification.

SUMMARY OF THE INVENTION

It is an object of the present invention to provide a microscope objective lens which, in spite of having a great numerical aperture and a high magnification, can always maintain an excellent imaging performance even if the thickness of a prallel flat plate such as a cover glass disposed between the object surface and the objective lens is greatly varied.

The invention will become fully apparent from the following detailed description thereof taken in conjunction with the accompanying drawings.

BRIEF DESCRIPTION OF THE DRAWINGS

FIGS. 8 to 10 show various aberrations of each of embodiments at a state where the cover glass of each of the embodiments has different thicknesses, in which FIGS. 8A, 9A and 10A show various aberrations where there is no cover glass, FIGS. 8B, 9B and 10B show various aberrations where there is a cover glass having the thickness of 1 mm, and FIGS. 8C, 9C and 10C show various aberrations where there is a cover glass having the thickness of 1.5 mm.

DESCRIPTION OF THE PREFERRED EMBODIMENTS

Figure 1:
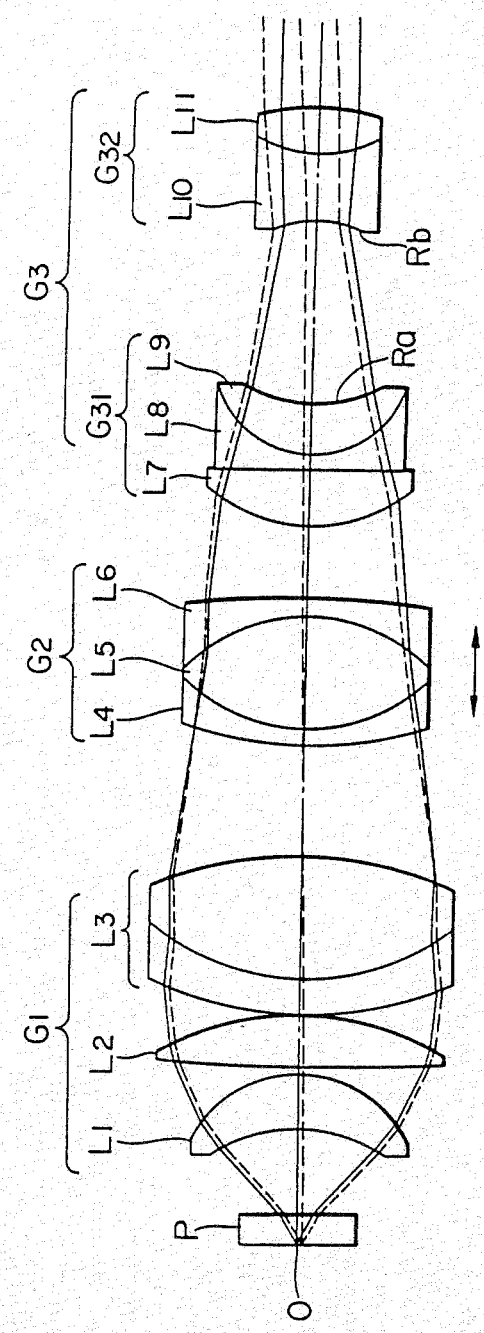
FIG. 1 shows the lens construction of a first embodiment in which any aberration fluctuation by the cover glass can be corrected.

A microscope objective lens according to the present invention basically has, in succession from the object O side, a first lens group G1 of positive refractive power for converting the light flux from an object into a convergent light flux, the first lens group G1 having a positive meniscus lens component having its concave surface facing the object side and a cemented lens component, a second lens group G2 having a cemented lens component of negative refractive power disposed in the convergent light flux, and a third lens group G3 of negative refractive power having a meniscus lens component having its convex surface facing the object side and a succeeding negative lens component.

Where the microscope objective lens of the present invention having the basic construction as described above is used to effect a microscopic examination with a parallel flat plate such as a cover glass or a culture container disposed between an object O and the first lens group G1, the second lens group G2 is provided so as to be movable on the optical axis relative to the first lens group G1 and the third lens group G3, whereby the imaging performance deteriorated by a variation in the thickness of the parallel flat plate can be corrected. More specifically, where the thickness of the parallel flat plate P such as a cover glass or a culture container is greater than a predetermined design standard value, the second lens group G2 is moved toward the third lens group G3 and where the thickness of the parallel flat plate is smaller than the predetermined design standard value, the second lens group G2 is moved toward the first lens group G1, whereby an aberration corrected condition similar to that at the design standard value can always be maintained. To enable such aberration correction to be accomplished, it is of course necessary to provide in advance a space in which the second lens group G2 can be moved along the optical axis between the first lens group G1 and the third lens group G3.

In order that the correction as described above may be well accomplished, the aberration structure of each lens groups must be as follows. The first lens group G1 is endowed with a strong converging action and a considerably great negative spherical aberration. The second lens group G2 is endowed with a positive spherical aberration which substantially offsets the negative spherical aberration created in the first lens group G1. The third lens group G3 of negative refractive power corrects the Petzval sum of the entire system and maintains the planarity of the image plane. It is desirable to provide in the third lens group G3 two lens surfaces opposed to each other with concave surfaces facing each other with an air space therebetween and correct Petzval sum by the diverging action in these two concave surfaces, but this is not essential when it is a principal object to correct spherical aberration.

With such a basic structure as the standard, spherical aberration can be varied by the second lens group G2 being moved relatively on the axis between the first lens group G1 and the third lens group G3. That is, the second lens group G2 of relatively small refractive power is positioned in the convergent light flux emerging from the first lens group G1 and therefore, if the second lens group G2 is moved more toward the third lens group G3 than the reference position thereof, the height at which the convergent light flux cuts the second lens group G2 will become lower than that at the reference position and the amount of positive spherical aberration created in the second lens group G2 will decrease. Conversely, if the second lens group G2 is moved more toward the first lens group G1 than the reference position thereof, the height at which the convergent light flux cuts the second lens group G2 will become higher than that at the reference position and the amount of positive spherical aberration created in the second lens group G2 will increase. Accordingly, spherical aberration greatly fluctuated by the thickness of the parallel flat P such as a cover glass disposed between the objective lens and the object surface is corrected by movement of the second lens group G2. That is, if the thickness of the parallel flat plate P becomes greater, positive spherical aberration is created and, to correct this, the second lens group G2 may be moved toward the third lens group G3 to decrease the amount of positive spherical aberration in the second lens group G2. On the other hand, if the thickness of the prallel flat plate P becomes smaller, negative spherical aberration is created and therefore, the second lens group G2 may be moved toward the first lens group G1 to increase the amount of positive spherical aberration in the second lens group G2. Such a situation of aberration correction can be known also from the tertiary aberration coefficient of spherical aberration as will be described later.

The lens construction of each lens group will now be described. As in the embodiments shown, the first lens group G1 has a considerably strong positive refractive power for converting the light flux from the object into a convergent light flux and for this purpose, it is desirable that the first lens group have at least three positive lens components. Of these lens components, the positive lens which is most adjacent to the object side is of a meniscus shape having its concave surface facing the object side. As regards the second positive lens, it is desirable that the image side surface thereof be of sharper curvature, and it is desirable to provide a cemented surface in at least one of the three positive lenses. The second lens group G2 has a negative refractive power and the function of creating spherical aberration greatly in the positive sense and therefore, as in the embodiments shown, it is formed by cementing together a negative meniscus lens convex toward the object side, a biconvex positive lens and a negative lens. The shape of the second lens group as a whole is like that of a positive lens, but the refractive index of the negative meniscus lens is higher than that of the biconvex lens and therefore, the second lens group as a whole has a negative refractive power. This is because the second lens group G2 is intended to have the function of correcting spherical aberration in the positive sense.

In each embodiment which will be described later, the second lens group G2 is constructed as a lens group of negative refractive power comprising three lenses cemented together. As a further alternative, the second lens group may be divided into and comprised of a plurality of groups such as positive and negative lens groups.

The third lens group G3 directed chiefly to the correction of Petzval sum has a negative refractive power as a whole, but it is desirable that the forward group G31 of the third lens group have a weak positive refractive power and the rearward group have a weak negative refractive power. The concave surface Ra of the forward group G31 which is most adjacent to the image side and the concave surface Rb of the rearward group which is most adjacent to the object side function as the opposed concave surfaces in the third lens group as described previously. It is desirable that the forward group G31 of the third lens group be formed by cementing together a positive lens, a negative lens and a positive meniscus lens having its concave surface facing the object side. However, the negative lens and the positive meniscus lens cemented together in the forward group G31 form a hyperchromatic lens and therefore, the direction of this cemented surface may also be reversed. Also, it is desirable that the rearward group G32 of the third lens group be formed by cementing together a biconcave negative lens and a biconvex positive lens.

FIG. 1 shows the lens construction of a first embodiment of the present invention. This embodiment is an example in which the second lens group G2 may be moved relative to the first and third lens groups G1 and G3 in accordance with a variation in the thickness of the cover glass to thereby correct any fluctuation of aberrations resulting from the variation in the thickness of the cover glass. The numerical data of the first embodiment are shown in Table 1 below. In the Table 1, the left-hand numbers represent the order from the object side, and $d_0$ represents the distance from the vertex of the foremost lens surface of the objective lens to the surface of the cover glass.

TABLE 1

(First Embodiment)

Focal length f = 1.0   N.A. = 0.7

TABLE 1-continued (First Embodiment)

Magnification $\beta = 61$

| No. | Radius of curvature r | Center thickness and air space of each lens d | Refractive index n | Abbe number ν | | |
|---|---|---|---|---|---|---|
| | ∞ | (0.4548) | 1.52216 | 58.8 | | Cover glass P |
| | ∞ | (d$_0$ = 1.3859) | 1.0 | | | |
| 1 | −2.8310 | 0.9475 | 1.713 | 54.0 | L$_1$ | |
| 2 | −1.9995 | 0.0758 | 1.0 | | | |
| 3 | +24.7522 | 0.8527 | 1.49782 | 82.3 | L$_2$ | |
| 4 | −4.5072 | 0.0379 | 1.0 | | | G1 |
| 5 | +5.6203 | 0.5685 | 1.75692 | 31.7 | L$_3$ | |
| 6 | +3.6523 | 2.0465 | 1.43388 | 95.6 | | |
| 7 | −6.4804 | (d$_7$ = variable) | 1.0 | | | |
| 8 | +6.5565 | 0.2842 | 1.6968 | 55.6 | L$_4$ | |
| 9 | +2.8716 | 1.8191 | 1.43388 | 95.6 | L$_5$ | G2 |
| 10 | −2.8716 | 0.3411 | 1.62041 | 60.3 | L$_6$ | |
| 11 | −15.9184 | (d$_{11}$ = variable) | 1.0 | | | |
| 12 | +2.5017 | 0.9664 | 1.49782 | 82.3 | L$_7$ | |
| 13 | −142.5109 | 0.2274 | 1.71736 | 29.5 | L$_8$ | G31 |
| 14 | +1.5694 | 0.9475 | 1.713 | 54.0 | L$_9$ | |
| 15 | +3.0702 | 2.9750 | 1.0 | | | G3 |
| 16 | −1.4057 | 1.0820 | 1.713 | 54.0 | L$_{10}$ | G32 |
| 17 | +1.7331 | 0.7580 | 1.72825 | 28.3 | L$_{11}$ | |
| 18 | −3.8671 | 1.0 | | | | |

| Thickness of cover glass | d$_0$ | d$_7$ | d$_{11}$ |
|---|---|---|---|
| 0.2653f | 1.5130 | 1.2128 | 1.7812 |
| 0.4548f | 1.3859 | 1.8570 | 1.1370 |
| 0.6443f | 1.2584 | 2.6529 | 0.3411 |

Figure 2A:
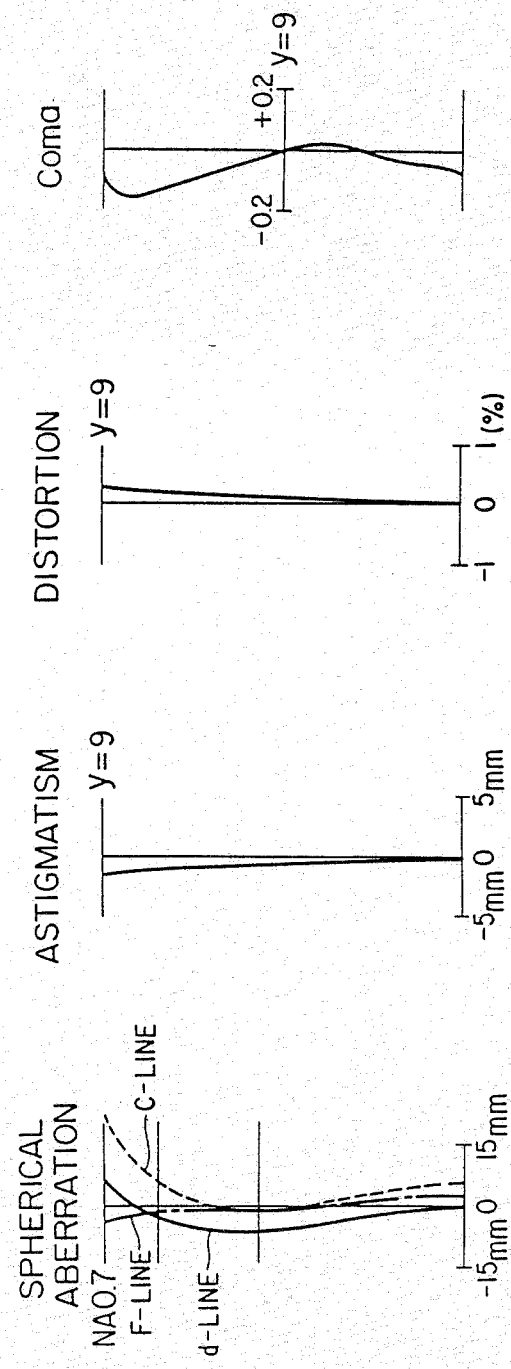
FIGS. 2A, 2B and 2C are aberration graphs which represent the result of the aberration correction effected in accordance with the thickness of the cover glass in the first embodiment.
Figure 2B:
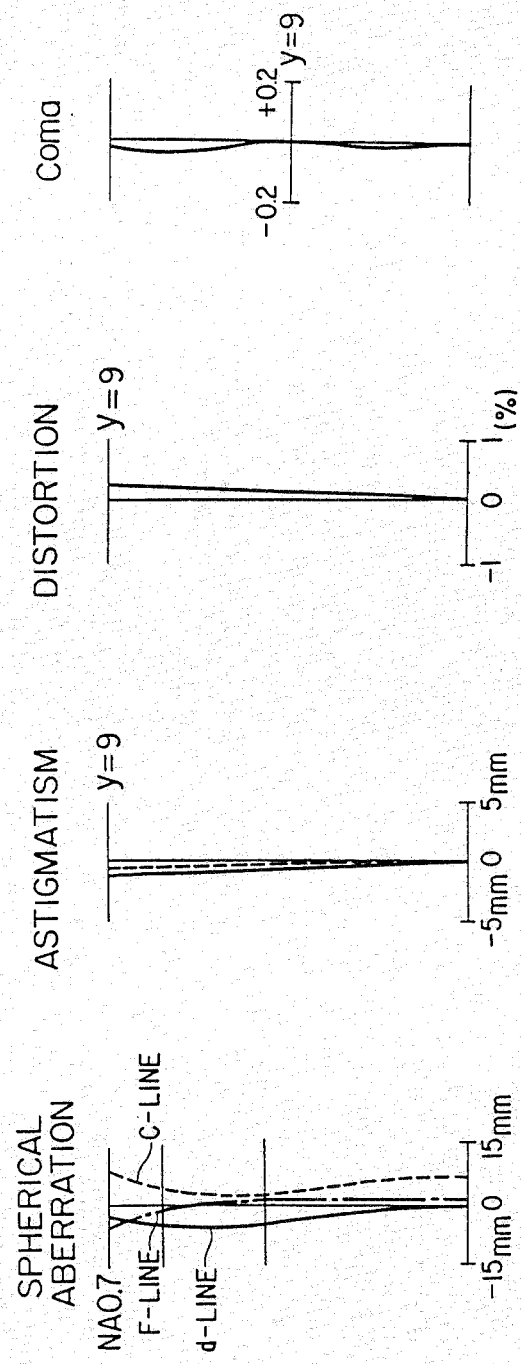
Figure 2C:
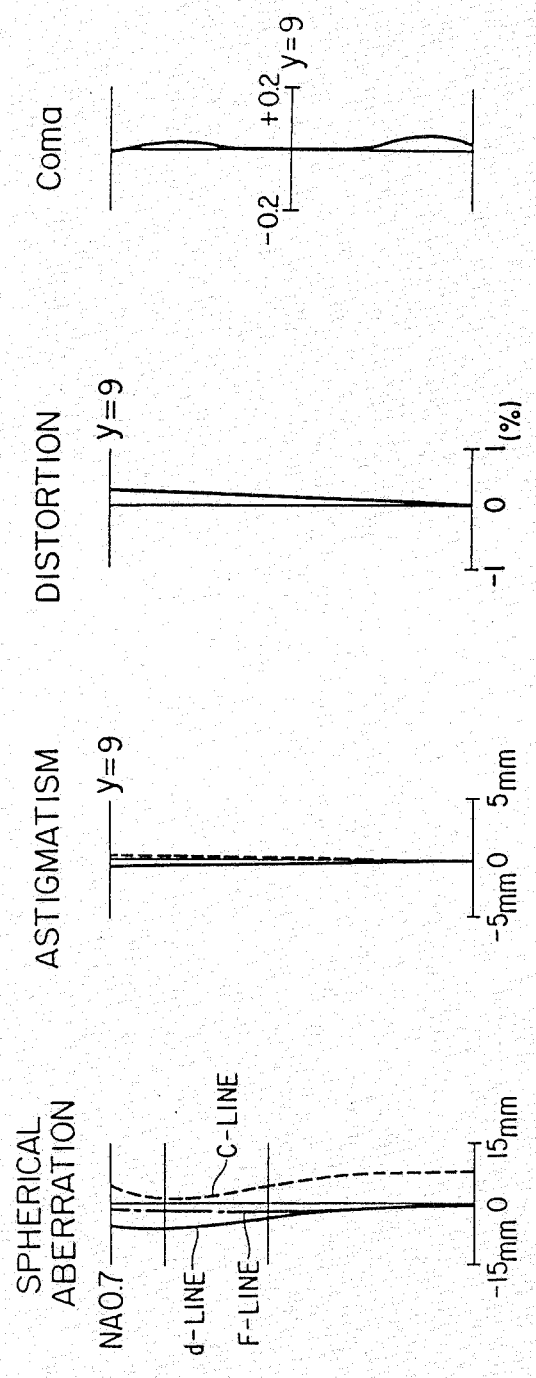

FIGS. 2A, 2B and 2C show the various aberrations when the objective lens of the first embodiment has been proportionally enlarged so that as a practical objective lens of a magnification of 61, f=2.64 mm, that is, the distance from the object surface to the image plane is 195 mm, FIG. 2A showing the various aberrations in a state in which the thickness of the cover glass is relatively small, say, 0.7 mm (0.2653f), FIG. 2B showing the various aberrations in the standard in which the thickness of the cover glass is 1.2 mm (0.4548f), and FIG. 2C showing the various aberrations in a state in which the thickness of the cover glass is as great as 1.7 mm (0.6443f). In these aberration graphs, spherical aberration, astigmatism, distortion and coma are shown and the standard light ray is di-line ($\lambda$=587.6 nm), and C-line ($\lambda$=656.3 nm) and F-line ($\lambda$=486.1 nm) are also shown to show chromatic spherical operation. In these Figures, the value of y represents the image height.

From these aberration graphs, it is clear that the objective lens of the first embodiment has a great working distance and a great numerical aperture of N.A.=0.7 and yet always maintains an excellent imaging performance over a wide range of the thickness of the cover glass, i.e., 0.7 mm to 1.7 mm.

The tertiary aberration coefficients of spherical aberration in the first embodiment are shown in Table 2 below. In Table 2, the coefficients in the three cases of the thickness of the cover glass shown in Table 1, and the left-hand numbers represent the order of the lens surfaces from the object side. According to Table 2, as the cover glass is thicker, the tertiary aberration coefficient of spherical aberration in the surface of the cover glass is of a greater value in the negative sense, and this endorses that the spherical aberration of the cover glass increases in the positive sense. It is apparent that even if the cover glass becomes thicker, the tertiary aberration coefficients of spherical aberration in the first G1 and the third lens group G3 hardly vary, whereas the tertiary aberration coefficient of spherical aberration in the second lens group G2 varies greatly and the second lens group G2 substantially offsets the variation in the aberration coefficient in the surface of the cover glass. As a result, the teritary aberration coefficient of spherical aberration in the entire system is a substantially constant small value even if the thickness of the cover glass is varied. This endorses that spherical aberration is always corrected well, and is well coincident with the spherical aberration graphs shown in FIGS. 2A, 2B and 2C.

TABLE 2

Tertiary Aberration Coefficients of Spherical Aberration

| Thickness of cover glass | 0.2653f | 0.4548f | 0.6443f |
|---|---|---|---|
| Surface of cover | −0.09260 | −0.15913 | −0.22604 |
| 1 | 0.13241 | 0.13320 | 0.13409 |
| 2 | −0.06343 | −0.06387 | −0.06435 |
| 3 | 0.31510 | 0.31600 | 0.31695 |
| 4 | 0.01821 | 0.01786 | 0.01744 |
| 5 | 0.29924 | 0.30044 | 0.30177 |
| 6 | −0.27883 | −0.27957 | −0.28036 |
| 7 | 0.14135 | 0.14064 | 0.13977 |
| 1st group G1, total | (0.56405) | (0.5647) | (0.56531) |
| 8 | 0.00097 | 0.00045 | −0.00003 |
| 9 | −0.16103 | −0.13800 | −0.11330 |
| 10 | −0.30704 | −0.26882 | −0.22710 |
| 11 | 0.01782 | 0.01629 | 0.1455 |
| 2nd group G2, total | (−0.44928) | (−0.39008) | (−0.32588) |
| 12 | 0.11800 | 0.11725 | 0.11648 |
| 13 | −0.03040 | −0.03020 | −0.03001 |
| 14 | −0.00174 | −0.00173 | −0.00172 |
| 15 | 0.00230 | 0.00228 | 0.00227 |
| 16 | −0.10465 | −0.10398 | −0.10330 |
| 17 | 0.00279 | 0.00277 | 0.00275 |
| 18 | 0.00381 | 0.00378 | 0.00376 |
| 3rd group G3, total | (−0.00989) | (−0.00983) | (−0.00977) |
| Sum total of entire system | 0.01228 | 0.00565 | 0.00362 |

Figure 4:
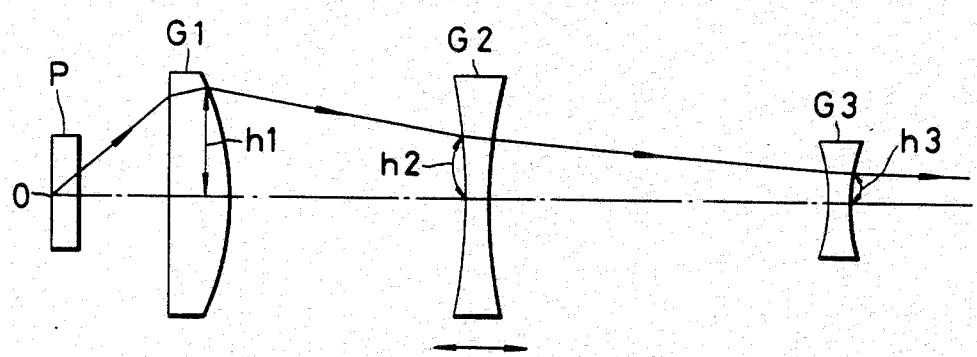
FIG. 4 shows the basic lens constructions of second to fourth embodiments of the present invention.

The second lens group G2 in the above first embodiment has a weak negative refractive power. However, it is found that even when the second lens group has a relatively strong negative refractive power for example as shown by the basic lens construction in FIG. 4, aberration change occuring by the parallel flat plate disposed between the object and the first lens group can be corrected.

In this case, aberration structure of each of lens groups is basically such as in the foregoing and the second lens group in response to the change in the thickness of the parallel flat plate is moved in a similar way. Specifically, it is desirable for the second lens group to satisfy the following condition $$-50f < f_2 < -10f \quad (1)$$

where f is a focal length of the entire system and $f_2$ is a focal length of the second lens group.

If the lower limit of the condition (1) is exceeded, the negative refractive power of the second lens group becomes too weak so that an amount of occurrence of positive spherical aberration becomes less and therefore, it becomes difficult to well correct negative spherical aberration in the first lens group. On the other hand, if the upper limit of the condition (1) is exceeded, the refractive power of the second lens group becomes too strong, so that spherical aberration becomes overcorrected. In this case, the third lens group G3 having negative refractive power corrects the Petzval sum of the entire system to maintain the planarity of the image plane.

Second, third and fourth embodiments having structures where negative refractive power of the second lens group G2 is relatively strong are now described in detail.

Figure 5:
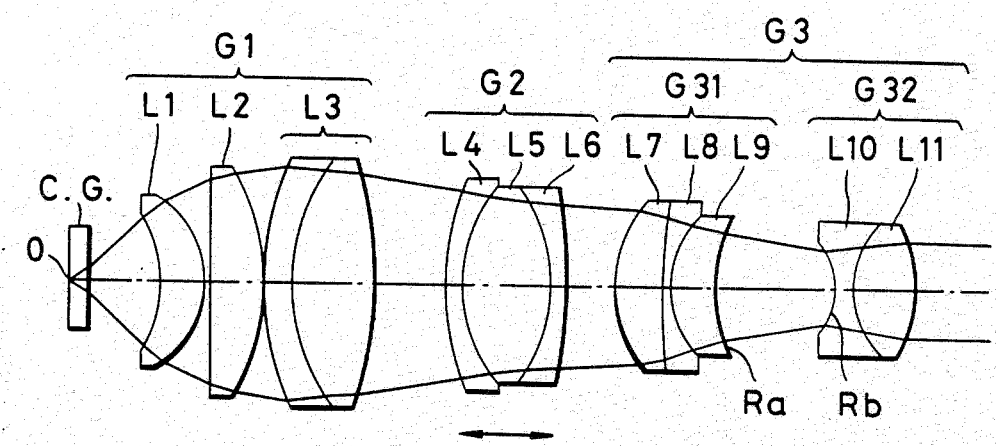
FIG. 5 shows the lens construction of second embodiment thereof.
Figure 6:
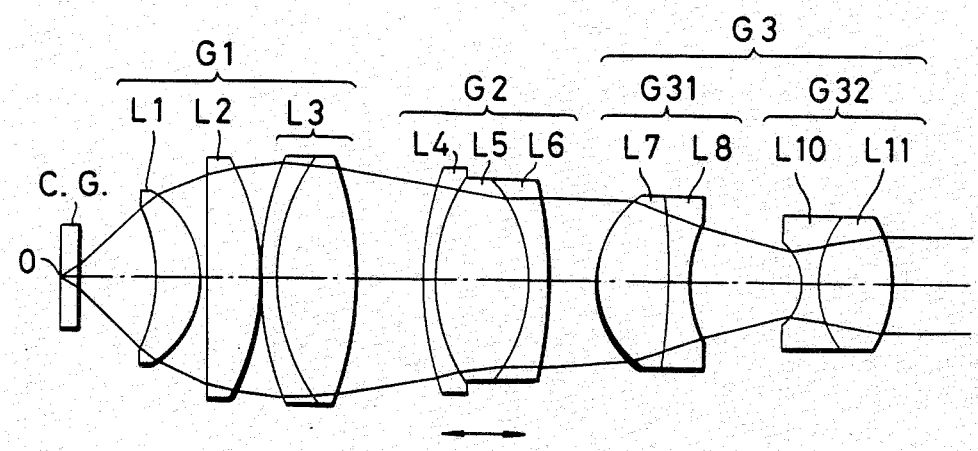
FIG. 6 shows the lens construction of third embodiment thereof.
Figure 7:
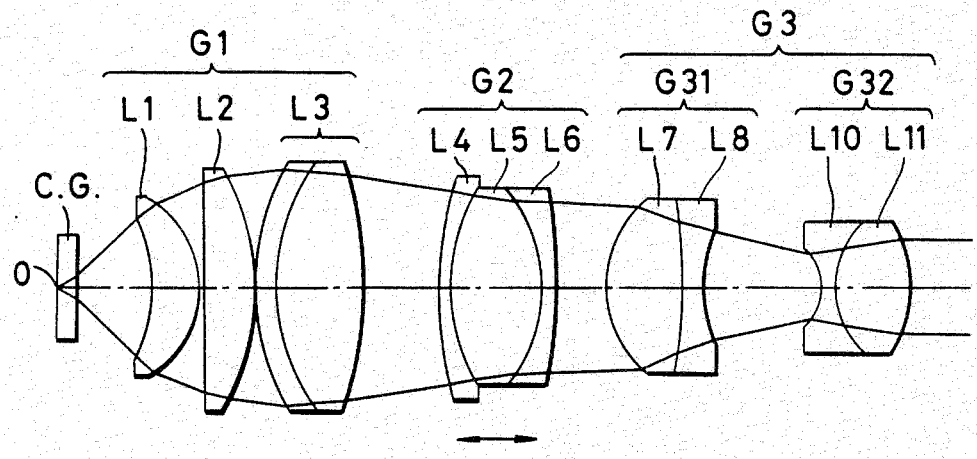
FIG. 7 shows a lens construction of fourth embodiment thereof.

Second, third and fourth embodiments are so designed as to use with three kinds of cover glasses having different refractive indexes and different dispersions in so-called dry system objective lens. Magnification of each of these three embodiments is 50 and numerical aperture (=N.A) thereof is 0.7. Working distance (=W.D) thereof is about 1.0f which is equal to the focal length f of the entire system. Each of FIGS. 5 to 7 shows a lens construction in a state where cover glass C.G. of reference thickness is inserted between the object and the objective lens. Numerical data in second, third and fourth embodiments are shown in Tables 3 to 5 respectively. In these Tables left-hand numbers show the order from the object side and do represents the distance between the vertex of the foremost lens surface of the objective lens and the surface of the cover glass. In these Tables, the values of back focal length Bf in these three embodiments and variable space of each lens in a case where the thickness of the cover glass changes are also shown.

TABLE 3

(second Embodiment)

Focal length f = 1.000  Back focal length Bf = 45.4613
N.A. = 0.7  Magnification 50

| No | r | d | n | ν | |
|---|---|---|---|---|---|
| 1 | −1.9140 | 0.6379 | 1.65160 | 58.54 | G1 |
| 2 | −1.2772 | 0.0463 | | | |
| 3 | 45.7324 | 0.4639 | 1.49782 | 82.28 | |
| 4 | −2.8114 | 0.2320 | | | |
| 5 | 3.2217 | 0.3364 | 1.75520 | 27.54 | |
| 6 | 2.2501 | 1.1830 | 1.43388 | 95.57 | |
| 7 | −4.7993 | (variable) | | | |
| 8 | 4.2865 | 0.1738 | 1.69680 | 55.61 | G2 |
| 9 | 1.8096 | 1.2062 | 1.43388 | 95.57 | |
| 10 | −1.9434 | 0.2320 | 1.69680 | 55.61 | |

TABLE 3-continued (second Embodiment)

| No | r | d | n | ν | |
|---|---|---|---|---|---|
| 11 | −9.2691 | (variable) | | | |
| 12 | 1.4498 | 0.5915 | 1.49782 | 82.28 | G31 |
| 13 | 6.2412 | 0.1508 | 1.74000 | 28.27 | |
| 14 | 1.3200 | 0.6263 | 1.49782 | 82.28 | |
| 15 | 1.8223 | 1.5774 | | | |
| 16 | −0.8604 | 0.2552 | 1.61266 | 44.40 | G32 |
| 17 | 1.1462 | 0.8583 | 1.61650 | 30.98 | |
| 18 | −1.6587 | 45.4613 | | | |

| Thickness of cover glass | d0 | d7 | d11 |
|---|---|---|---|
| 0.0 | 1.1023 | 0.3978 | 1.2143 |
| 0.2320 | 0.9386 | 0.9487 | 0.66342 |
| 0.3480 | 0.8559 | 1.3036 | 0.3085 |

TABLE 4

(Third Embodiment)

Focal length f = 1.000  Back focal length Bf = 45.2844
N.A. = 0.7  Magnification 50

| No | r | d | n | ν | |
|---|---|---|---|---|---|
| 1 | −1.9379 | 0.6337 | 1.67003 | 47.05 | G1 |
| 2 | −1.2687 | 0.0461 | | | |
| 3 | 50.2135 | 0.6913 | 1.49782 | 82.56 | |
| 4 | −3.0050 | 0.0230 | | | |
| 5 | 3.6834 | 0.2304 | 1.72825 | 28.34 | |
| 6 | 2.6195 | 1.0369 | 1.43388 | 95.57 | |
| 7 | −4.9157 | (variable) | | | |
| 8 | 4.8493 | 0.1728 | 1.75692 | 31.70 | G2 |
| 9 | 2.2043 | 1.1982 | 1.43388 | 95.57 | |
| 10 | −1.9013 | 0.2535 | 1.74810 | 52.28 | |
| 11 | −7.3956 | (variable) | | | |
| 12 | 1.2687 | 0.9908 | 1.49782 | 82.56 | G31 |
| 13 | −6.8225 | 0.2650 | 1.75692 | 31.70 | |
| 14 | 1.6699 | 1.4747 | | | |
| 15 | −0.6686 | 1.2420 | 1.61266 | 44.40 | G32 |
| 16 | 1.5001 | 1.0024 | 1.61650 | 30.98 | |
| 17 | −1.4705 | | | | |

| Thickness of cover glass | d0 | d7 | d11 |
|---|---|---|---|
| 0.0 | 1.1761 | 0.3860 | 1.2155 |
| 0.2304 | 1.0192 | 0.9355 | 0.6659 |
| 0.3456 | 0.9395 | 1.2881 | 0.3134 |

TABLE 5

(Fourth Embodiment)

Focal length f = 1.000  Back focal length Bf = 45.3073
N.A. = 0.7  Magnification 50

| No | r | d | n | ν | |
|---|---|---|---|---|---|
| 1 | −2.0272 | 0.6363 | 1.67003 | 47.05 | G1 |
| 2 | −1.2844 | 0.0463 | | | |
| 3 | 798.2851 | 0.6942 | 1.49782 | 82.56 | |
| 4 | −3.0543 | 0.0231 | | | |
| 5 | 3.5388 | 0.2777 | 1.72825 | 28.34 | |
| 6 | 2.5399 | 1.1569 | 1.43388 | 95.57 | |
| 7 | −4.8577 | (variable) | | | |
| 8 | 4.6745 | 0.1735 | 1.74950 | 35.19 | G2 |
| 9 | 4.6745 | 1.2032 | 1.43388 | 95.57 | |
| 10 | −1.9137 | 0.2314 | 1.74810 | 52.28 | |
| 11 | −8.0914 | (variable) | | | |
| 12 | 1.3167 | 1.0644 | 1.49782 | 82.56 | G31 |
| 13 | −5.6216 | 0.2545 | 1.75520 | 27.64 | |
| 14 | 1.7484 | 1.5804 | | | |
| 15 | −0.6759 | 0.1851 | 1.61266 | 44.40 | G32 |
| 16 | 1.0022 | 1.0181 | 1.61650 | 30.98 | |
| 17 | −1.4347 | | | | |

| Thickness of cover glass | d0 | d7 | d11 |
|---|---|---|---|
| 0.0 | 1.1795 | 0.4049 | 1.2032 |
| 0.2314 | 1.0218 | 0.9533 | 0.6548 |
| 0.3471 | 0.9418 | 1.3062 | 0.3020 |

It is noted that the cover glass used in second embodiment has the refractive index of 1.49108 and Abbe number of 57.57; the cover glass used in third embodiment has the refractive index of 1.58518 and Abbe number of 30.24; and the cover glass used in fourth embodiment has the refractive index of 1.58710 and Abbe number of 33.43. It is noted that the focal length of the second lens group G2 in each of second, third and fourth embodiments is $-26.82f$, $-20.62f$ and $-19.06f$ respectively where f represents the focal length of the entire system.

FIGS. 8 to 10 show aberration graphs of each of these three embodiments in a case where the distance from the object surface to the image plane is proportionally enlarged to reach 245 mm and therefore practical objective lens is obtained.

Figure 10A:
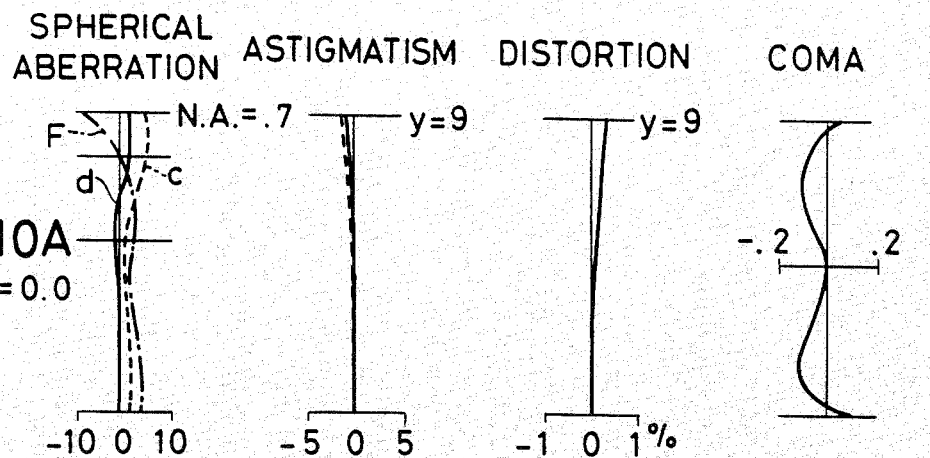
Figure 10B:
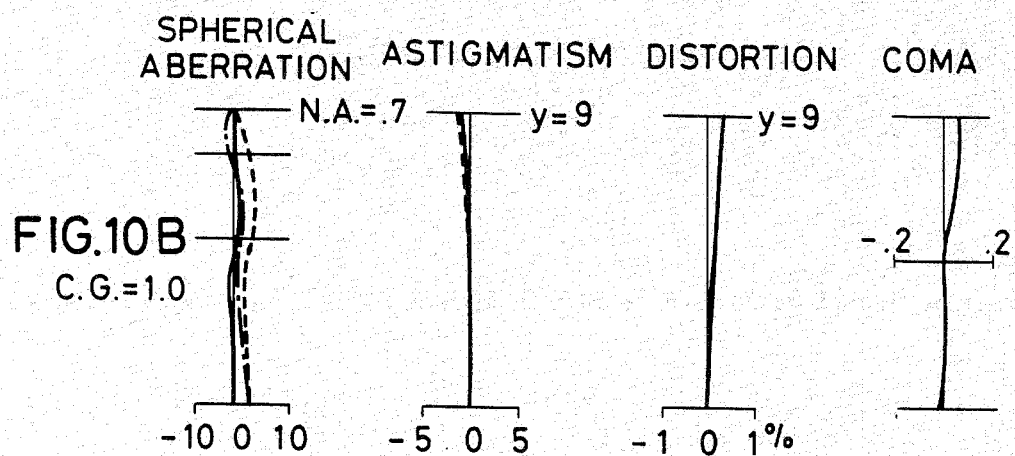
Figure 10C:
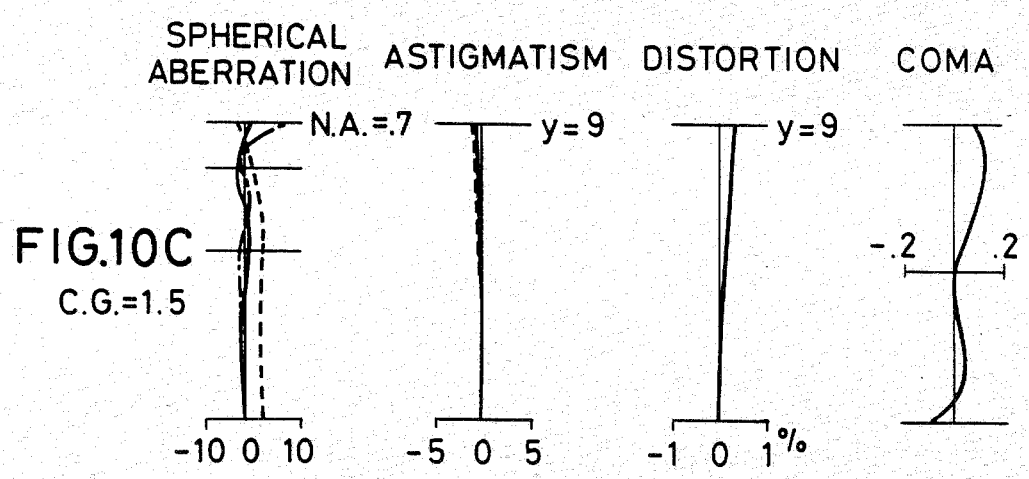

FIGS. 8A, 9A and 10A show various aberrations at a state where there is no cover glass C.G. FIGS. 8B, 9B and 10B show various aberrations at a state where there is a cover glass whose thickness is 1 mm. FIGS. 8C, 9C and 10C show various aberrations at a state where there is a cover glass whose thickness is 1.5 mm.

It is apparent from each of aberration graphs of FIGS. 8 to 10 that each of objective lenses in second to fourth embodiments has a high magnification of 50, a large numerical aperture of 0.7 and a long working distance and yet maintains excellent image performance over wide ranges of 0 to 1.5 mm in the thickness of the cover glass.

Figure 3:
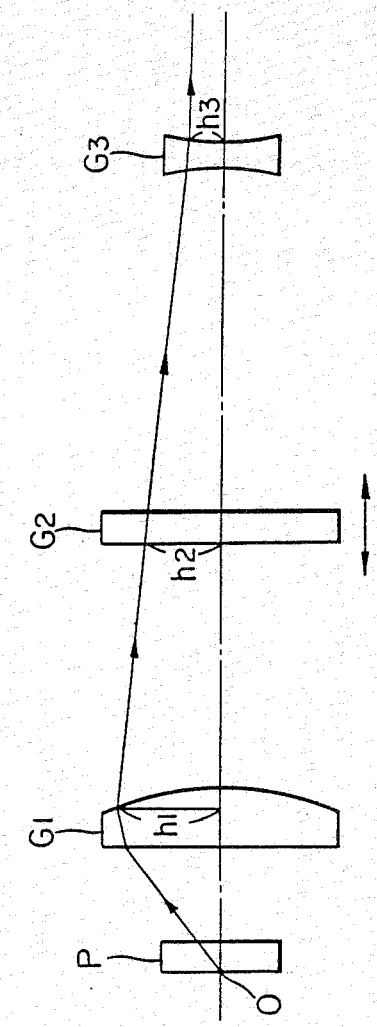
FIG. 3 shows a basic construction for effecting aberration correction by moving a second lens group in accordance with the thickness of the cover glass.

The basic characteristics of the aberration fluctuation correction by the parallel flat plate as in the above-described first embodiment lies in that, as already described, the light flux from the object is converted into a convergent light flux by the first lens group and the converged state of the light flux is substantially maintained even after the light flux passes through the second lens group. The light flux is condensed at a predetermined image plane position after it passes through the third lens group. Therefore, as shown in FIG. 3, the height at which the paraxial ray from the on-axis object point cuts each lens group is highest in the first lens group G1 and lower in the order of the second G2 and the third lens group G3. When the maximum values of the heights at which the paraxial ray from the on-axis object point cuts the first and second lens groups are $h_1$ and $h_2$ and the height at which the paraxial ray emerges from the third lens group is $h_3$, it is necessary that $h_1 > h_2 > h_3$. Accordingly, as regards the effective diameters of the respective lens groups, the first lens group is greatest and the third lens group is smallest, and it is desirable to construct the lens groups to such a degree that $6h_3 > h_1 > 2h_3$. Where the present invention is applied to an objective lens of higher magnification, the value of the ratio of $h_1$ to $h_3$ becomes greater, and where the present invention is applied to an objective lens of lower magnification, the value of the ratio of $h_1$ to $h_3$ becomes smaller. Also, it is desirable that the gradient of the light ray passed through the first lens group G1 have a value five to ten times as great as the gradient of the light ray passed through the entire system. This is because, as previously described, when the second lens group G2 is moved along the optical axis between the first lens group G1 and the third lens group G3, the amount of correction of spherical aberration differs depending on the height of the light ray entering the second lens group G2, and this gradient has the tendency of becoming greater for an objective lens of higher magnification and becoming smaller for an objective lens of lower magnification. Also, the construction in which the effective diameter of the first lens group is greatest is advantageous for making the working distance great.

The objective lens according to the present invention is an objective lens of high magnification having a great numerical aperture and yet suffering from less deterioration of aberration even if the thickness of the parallel flat plate such as the cover glass is greatly varied, and can always maintain a good imaging performance. Also, when the refractive power of the lens group moved for aberration correction is weak, the variations in the principal point and focus position of the objective lens are slight and thus, even if the correcting ring is operated, the amount of out-of-focus is slight, and this is convenient.

We claim:

1. A microscope objective lens having a great numerical aperture and a high magnification and yet being capable of always maintaining an excellent imaging performance even if the thickness of a parallel flat plate such as a cover glass disposed between the object surface and the objective lens is varied greatly, said objective lens comprising, in succession from the object side, a first lens group having a positive refractive power and converting a light flux from an object into a convergent light flux, a second lens group of small refractive power creating positive spherical aberration and being movable along the optical axis in said convergent light flux, and a third lens group having a negative refractive power, said second lens group being movable relative to said first and third lens groups in accordance with a variation in the thickness of the parallel flat plate disposed between said object and said first lens group, whereby any fluctuation of aberrations may be corrected.

2. A microscope objective lens according to claim 1, wherein said second lens group is moved toward said third lens group when the thickness of said parallel flat plate is greater than a predetermined reference value, and is moved toward said first lens group when the thickness of said parallel flat plate is smaller than the predetermined reference value.

3. A microscope objective lens according to claim 2, wherein said first lens group has the function of creating negative spherical aberration, and said third lens group has the function of correcting the Petzval sum of the entire system and maintaining the planarity of the image plane.

4. A microscope objective lens according to claim 3, satisfying the following condition:

$$h_1 > h_2 > h_3$$

where $h_1$ and $h_2$ are the maximum values of the heights at which the paraxial ray from the on-axis object point cuts said first lens group and said second lens group respectively and $h_3$ is the height of the paraxial ray from the on-axis object point which emerges from said third lens group.

5. A microscope objective lens according to claim 4, further satisfying the following condition:

$$6h_3 > h_1 > 2h_3.$$

6. A microscope objective lens according to claim 5, wherein the gradient of a light ray passing through said first lens group is five to ten times the gradient of a light ray passing through the entire system.

7. A microscope objective lens according to claim 3, wherein said third lens group comprises a meniscus lens component which has its convex surface facing the object side and has a cemented convex surface facing the image side, and comprises a negative lens component which has a concave surface facing the object side.

8. A microscope objective lens according to claim 7, wherein said second lens group has a cemented component comprising a negative meniscus lens convex toward the object side, a biconvex position lens and a negative lens.

9. A microscope objective lens according to claim 8, wherein numerical data are as follows:

Focal length f=1.0
N.A.=0.7
Magnification $\beta=61$

| No. | Radius of curvature r | Center thickness and air space of each lens d | Refractive index n | Abbe number $\nu$ | | |
|---|---|---|---|---|---|---|
|  | ∞ | (0.4548) | 1.52216 | 58.8 |  | Cover glass P |
|  | ∞ | ($d_0$ = 1.3859) | 1.0 |  |  |  |
| 1 | −2.8310 | 0.9475 | 1.713 | 54.0 | $L_1$ |  |
| 2 | −1.9995 | 0.00758 | 1.0 |  |  |  |
| 3 | +24.7522 | 0.8527 | 1.49782 | 82.3 | $L_2$ |  |
| 4 | −4.5072 | 0.0379 | 1.0 |  |  | G1 |
| 5 | +5.6203 | 0.5685 | 1.75692 | 31.7 | $L_3$ |  |
| 6 | +3.6523 | 2.0465 | 1.43388 | 95.6 |  |  |
| 7 | −6.4804 | ($d_7$ = variable) | 1.0 |  |  |  |
| 8 | +6.5565 | 0.2842 | 1.6968 | 55.6 | $L_4$ |  |
| 9 | +2.8716 | 1.8191 | 1.43388 | 95.6 | $L_5$ | G2 |
| 10 | −2.8716 | 0.3411 | 1.62041 | 60.3 | $L_6$ |  |
| 11 | −15.9184 | ($d_{11}$ = variable) | 1.0 |  |  |  |
| 12 | +2.5017 | 0.9664 | 1.49782 | 82.3 | $L_7$ |  |
| 13 | −142.5109 | 0.2274 | 1.71736 | 29.5 | $L_8$ | G31 |
| 14 | +1.5694 | 0.9475 | 1.713 | 54.0 | $L_9$ |  |
| 15 | +3.0702 | 2.9750 | 1.0 |  |  | G3 |
| 16 | −1.4057 | 1.0820 | 1.713 | 54.0 | $L_{10}$ |  |
|  |  |  |  |  |  | G32 |
| 17 | +1.7331 | 0.7580 | 1.72825 | 28.3 | $L_{11}$ |  |
| 18 | −3.8671 |  | 1.0 |  |  |  |

| Thickness of cover glass | $d_0$ | $d_7$ | $d_{11}$ |
|---|---|---|---|
| 0.2653f | 1.5130 | 1.2128 | 1.7812 |
| 0.4548f | 1.3859 | 1.8570 | 1.1370 |
| 0.6443f | 1.2584 | 2.6529 | 0.3411 | where the left-hand numbers represent the order from the object side, and $d_0$ represents the distance from the vertex of the foremost lens surface of the objective lens to the surface of the cover glass.

10. A microscope objective lens having a great numerical aperture and a high magnification and yet being capable of always maintaining an excellent imaging performance even if the thickness of a parallel flat plate such as a cover glass disposed between the object surface and the objective lens is varied greatly, said objective lens comprising, in succession from the object side, a first lens group having a positive refractive power and converting a light flux from an object into a convergent light flux, a second lens group of negative refractive power creating positive spherical aberration and being movable along the optical axis in said convergent light flux, and a third lens group having a negative refractive power, said second lens group being movable relative to said first and third lens groups in accordance with a variation in the thickness of the parallel flat plate disposed between said object and said first lens group, whereby any fluctuation of aberrations may be corrected.

11. A microscope objective lens according to claim 10, satisfying the following condition:

$$-50f < f_2 < -10f$$

where $f_2$ is a focal length of said second lens group and f is a focal length of the entire system.

12. A microscope objective lens according to claim 11, wherein said second lens group is moved toward said third lens group when the thickness of said parallel flat plate is greater than a predetermined reference value, and is moved toward said first lens group when the thickness of said parallel flat plate is smaller than the predetermined reference value.

13. A microscope objective lens according to claim 12, wherein said first lens group has the function of creating negative spherical aberration, and said third lens group has the function of correcting the Petzval sum of the entire system and maintaining the planarity of the image plane.

14. A microscope objective lens according to claim 13, satisfying the following condition:

$$h_1 > h_2 > h_3$$

where $h_1$ and $h_2$ are the maximum values of the heights at which the paraxial ray from the on-axis object point cuts said first lens group and said second lens group respectively and $h_3$ is the height of the paraxial ray from the on-axis object point which emerges from said third lens group.

15. A microscope objective lens according to claim 14, further satisfying the following condition:

$$6h_3 > h_1 > 2h_3.$$

16. A microscope objective lens according to claim 15, wherein the gradient of a light ray passing through said first lens group is five to ten times the gradient of a light ray passing through the entire system.

17. A microscope objective lens according to claim 16, wherein said second lens group has a biconvex positive lens, a negative meniscus lens cemented to the object side of the biconvex positive lens and having its convex surface facing the object side and a negative meniscus lens cemented to the image side of the biconvex positive lens and having its convex surface facing the image side.

18. A microscope objective lens according to claim 16, wherein said third lens group has a meniscus-form front group having weak positive refractive power and having its convex surface facing the object side and a meniscus-form rear group having weak negative refractive power and having its concave surface facing the object side.

19. A microscope objective lens according to claim 16, wherein numerical data are as follows:

Focal length f=1.000
N.A=0.7
Back focal length Bf=45.4613, Magnification 50

| No. | Radius of curvature r | Center thickness and air space of each lens d | Refractive index n | Abbe number ν | |
|---|---|---|---|---|---|
| 1 | −1.9140 | 0.6379 | 1.65160 | 58.52 | G1 |
| 2 | −1.2772 | 0.0463 | | | |
| 3 | 45.7324 | 0.4639 | 1.49782 | 82.28 | |
| 4 | −2.8114 | 0.2320 | | | |
| 5 | 3.2217 | 0.3364 | 1.75520 | 27.54 | |
| 6 | 2.2501 | 1.1830 | 1.43388 | 95.57 | |
| 7 | −4.7993 | (variable) | | | |
| 8 | 4.2865 | 0.1738 | 1.69680 | 55.61 | G2 |
| 9 | 1.8096 | 1.2062 | 1.43388 | 95.57 | |
| 10 | −1.9434 | 0.2320 | 1.69680 | 55.61 | |
| 11 | −9.2691 | (variable) | | | |
| 12 | 1.4498 | 0.5915 | 1.49782 | 82.28 | G31 |
| 13 | 6.2412 | 0.1508 | 1.74000 | 28.27 | |
| 14 | 1.3200 | 0.6263 | 1.49782 | 82.28 | |
| 15 | 1.8223 | 1.5774 | | | |
| 16 | −0.8604 | 0.2552 | 1.61266 | 44.40 | G32 |
| 17 | 1.1462 | 0.8583 | 1.16150 | 30.98 | |
| 18 | −1.6587 | 45.4613 | | | |

| Thickness of cover glass | d0 | d7 | d11 |
|---|---|---|---|
| 0.0 | 1.1023 | 0.3978 | 1.2143 |
| 0.2320 | 0.9386 | 0.9487 | 0.66342 |
| 0.3480 | 0.8559 | 1.3036 | 0.3085 | where the left-hand numbers represent the order from the object side, and do represents the distance from the vertex of the foremost lens surface of the objective lens to the surface of the cover glass.

20. A microscope objective lens according to claim 16, wherein numerical data are as follows:

Focal length f=1.000
N.A=0.7
Back focal length Bf=45.2844, Magnification 50

| No. | Radius of curvature r | Center thickness and air space of each lens d | Refractive index n | Abbe number ν | |
|---|---|---|---|---|---|
| 1 | −1.9379 | 0.6337 | 1.67003 | 47.05 | G1 |
| 2 | −1.2687 | 0.0461 | | | |
| 3 | 50.2135 | 0.6913 | 1.49782 | 82.56 | |
| 4 | −3.0050 | 0.0230 | | | |
| 5 | 3.6834 | 0.2304 | 1.72825 | 28.34 | |
| 6 | 2.6195 | 1.0369 | 1.43388 | 95.57 | |
| 7 | −4.9157 | (variable) | | | |
| 8 | 4.8493 | 0.1728 | 1.75692 | 31.70 | G2 |
| 9 | 2.2043 | 1.1982 | 1.43388 | 95.57 | |
| 10 | −1.9013 | 0.2535 | 1.74810 | 52.28 | |
| 11 | −7.3956 | (variable) | | | |
| 12 | 1.2687 | 0.9908 | 1.49782 | 82.56 | G31 |
| 13 | −6.8225 | 0.2650 | 1.75692 | 31.70 | |
| 14 | 1.6699 | 1.4747 | | | |
| 15 | −0.6686 | 1.2420 | 1.61266 | 44.40 | G32 |
| 16 | 1.5001 | 1.0024 | 1.61650 | 30.98 | |
| 17 | −1.4705 | | | | |

| Thickness of cover glass | d0 | d7 | d11 |
|---|---|---|---|
| 0.0 | 1.1761 | 0.3860 | 1.2155 |
| 0.2304 | 1.0192 | 0.9355 | 0.6659 |
| 0.3456 | 0.9395 | 1.2881 | 0.3134 | where the left-hand numbers represent the order from the object side, and do represents the distance from the vertex of the foremost lens surface of the objective lens to the surface of the cover glass.

21. A microscope objective lens according to claim 16, wherein numerical data are as follows:

Focal length f=1.000
N.A=0.7
Back focal length Bf=45.3073, Magnification 50

| No. | Radius of curvature r | Center thickness and air space of each lens d | Refractive index n | Abbe number ν | |
|---|---|---|---|---|---|
| 1 | −2.0272 | 0.6363 | 1.67003 | 47.05 | G1 |
| 2 | −1.2844 | 0.0463 | | | |
| 3 | 798.2851 | 0.6942 | 1.49782 | 82.56 | |
| 4 | −3.0543 | 0.0231 | | | |
| 5 | 3.5388 | 0.2777 | 1.72825 | 28.34 | |
| 6 | 2.5399 | 1.1569 | 1.43388 | 95.57 | |
| 7 | −4.8577 | (variable) | | | |
| 8 | 4.6745 | 0.1735 | 1.74950 | 35.19 | G2 |
| 9 | 4.6745 | 1.2032 | 1.43388 | 95.57 | |
| 10 | −1.9137 | 0.2314 | 1.74810 | 52.28 | |
| 11 | −8.0914 | (variable) | | | |
| 12 | 1.3167 | 1.0644 | 1.49782 | 82.56 | G31 |
| 13 | −5.6216 | 0.2545 | 1.75520 | 27.64 | |
| 14 | 1.7484 | 1.5804 | | | |
| 15 | −0.6759 | 0.1851 | 1.61266 | 44.40 | G32 |
| 16 | 1.0022 | 1.0181 | 1.61650 | 30.98 | |
| 17 | −1.4347 | | | | |

| Thickness of cover glass | d0 | d7 | d11 |
|---|---|---|---|
| 0.0 | 1.1795 | 0.4049 | 1.2032 |
| 0.2314 | 1.0218 | 0.9533 | 0.6548 |
| 0.3471 | 0.9418 | 1.3062 | 0.3020 | where the left-hand numbers represent the order from the object side, and do represents the distance from the vertex of the foremost lens surface of the objective lens to the surface of the cover glass.

22. A microscope objective lens having a great numerical aperture and a high magnification and yet being capable of always maintaining an excellent imaging performance even if the thickness of a parallel flat plate such as a cover glass disposed between the object surface and the objective lens is varied greatly, said objective lens comprising:
a first lens group having a positive refractive power and converting a light flux from an object into a convergent light flux, said first lens group creating negative spherical aberration;
a second lens group disposed in the convergent light flux from the first lens group and being movable along the optical axis thereof, said second lens group creating positive spherical aberration; and a third lens group having a negative refractive power and receiving the light flux from the second lens group;

wherein when the thickness of said parallel flat plate is greater than a predetermined reference value, said second lens group is moved toward said third lens group in the convergent light flux emerging from the first lens group so as to compensate the positive spherical aberration created by said greater thickness parallel flat plate, and when the thickness of said parallel flat plate is smaller than said predetermined reference value, said second lens group is moved toward said first lens group in the convergent light flux emerging from the first lens group so as to compensate the negative spherical aberration created by said smaller thickness parallel flat plate.

23. A microscope objective lens according to claim 22, wherein said movable second lens group has a negative refractive power.

24. A microscope objective lens according to claim 22, wherein said movable second lens group includes a biconvex positive lens, a negative meniscus lens cemented to the object side of the biconvex positive lens and a negative meniscus lens cemented to the image side of the biconvex positive lens.

* * * * *